United States Patent
Aguilar (10) Patent No.: US 12,509,932 B1
(45) Date of Patent: Dec. 30, 2025

(54) CLIP ASSEMBLY FOR VEHICLE TORSION RODS

(71) Applicant: NISSAN NORTH AMERICA, INC., Franklin, TN (US)

(72) Inventor: Jose Armando Aguilar, Aguascalientes (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 18/759,332

(22) Filed: Jun. 28, 2024

(51) Int. Cl.
*E05F 1/12* (2006.01)

(52) U.S. Cl.
CPC ....... *E05F 1/1238* (2013.01); *E05Y 2201/486* (2013.01); *E05Y 2600/63* (2013.01); *E05Y 2900/548* (2013.01)

(58) Field of Classification Search
CPC ... F16L 3/23; F16L 3/233; F16L 3/237; E05F 1/123; E05F 1/1238; E05Y 2201/486; E05Y 2600/63; E05Y 2900/548
USPC .......................................................... 16/308
See application file for complete search history.

(56) References Cited

U.S. PATENT DOCUMENTS

| | | | |
|---|---|---|---|
| 1,859,563 A | 5/1932 | Joekel | |
| 2,150,435 A | 3/1939 | Floreth | |
| 2,894,277 A | 7/1959 | Bogatar et al. | |
| 2,986,770 A | 6/1961 | Hammond | |
| 3,024,488 A | 3/1962 | Germann | |
| 3,339,969 A * | 9/1967 | Bridle | E05F 1/1238 296/76 |
| 3,469,277 A | 9/1969 | Henrichs et al. | |
| 3,476,375 A | 11/1969 | Brasseur | |
| 4,199,177 A | 4/1980 | Danzer | |
| 4,291,501 A | 9/1981 | Steinberg et al. | |
| 4,458,379 A | 7/1984 | Shelton | |
| 5,365,639 A | 11/1994 | Lewkoski | |
| 5,458,303 A * | 10/1995 | Ruckwardt | H02G 3/26 248/68.1 |
| 5,584,099 A | 12/1996 | Westerdale | |
| 5,620,158 A * | 4/1997 | Rodondi | F16L 3/233 248/69 |
| 5,730,239 A | 3/1998 | Holter | |
| 5,746,468 A | 5/1998 | Schoen et al. | |
| 5,758,389 A | 6/1998 | Wolda | |
| 5,771,540 A | 6/1998 | Carpenter et al. | |

(Continued)

FOREIGN PATENT DOCUMENTS

| | | | |
|---|---|---|---|
| CN | 203864812 U | * | 10/2014 |
| CN | 208122583 U | * | 11/2018 |

(Continued)

*Primary Examiner* — Jeffrey O'Brien
(74) *Attorney, Agent, or Firm* — Global IP Counselors, LLP (57) ABSTRACT

A clip assembly for torsion rods of a closure panel of a vehicle includes a clip and an elastic member. The clip is configured to receive a first torsion rod and a second torsion rod. The elastic member is configured to be received by the clip. The clip includes a body member, a first leg extending outwardly in a first direction, and a second leg extending outwardly in a second direction opposite to the first direction. A first groove is disposed in the first leg and a second groove is disposed in the second leg. The first groove and the second groove are configured to receive the elastic member.

20 Claims, 5 Drawing Sheets

(56) References Cited

U.S. PATENT DOCUMENTS

| | | | |
|---|---|---|---|
| 5,787,549 A * | 8/1998 | Soderlund | E05F 1/123 |
| | | | 49/386 |
| 5,873,619 A | 2/1999 | Lewkoski et al. | |
| 6,419,293 B1 | 7/2002 | Nicholas et al. | |
| 6,568,033 B2 | 5/2003 | Kim | |
| 6,619,723 B2 | 9/2003 | Duffy | |
| 7,156,450 B2 | 1/2007 | McIntyre et al. | |
| 7,469,953 B2 | 12/2008 | Heath et al. | |
| 7,730,584 B2 | 6/2010 | Duffy | |
| 8,251,431 B2 | 8/2012 | Nakazato | |
| 8,414,058 B2 | 4/2013 | Duffy | |
| 8,469,433 B2 | 6/2013 | Krajenke et al. | |
| 8,540,305 B2 * | 9/2013 | Schulte | E05F 1/1238 |
| | | | 296/183.1 |
| 8,708,394 B1 * | 4/2014 | Sytek | E05F 1/1238 |
| | | | 49/386 |
| 8,978,203 B2 | 3/2015 | Krajenke et al. | |
| 9,062,801 B2 * | 6/2015 | Billarant | F16L 3/1236 |
| 9,062,802 B2 * | 6/2015 | Lairie | B65D 63/1009 |
| 9,217,267 B2 | 12/2015 | Duffy et al. | |
| 9,476,237 B2 * | 10/2016 | Sato | E05D 3/02 |
| 9,494,258 B2 * | 11/2016 | Flynn | F16L 3/237 |
| 10,246,920 B2 | 4/2019 | Sytek et al. | |
| 10,550,870 B2 * | 2/2020 | Lewis | F16L 3/13 |
| 10,907,391 B2 | 2/2021 | Lee | |
| 11,230,868 B2 | 1/2022 | Dennie | |
| 2008/0098567 A1 | 5/2008 | Duffy | |
| 2021/0237217 A1 * | 8/2021 | Giuffrè | B29C 53/083 |
| 2022/0102951 A1 * | 3/2022 | Badrenas | B60R 16/0215 |

FOREIGN PATENT DOCUMENTS

| | | | | |
|---|---|---|---|---|
| JP | 2020169722 A | * | 10/2020 | |
| KR | 0129310 Y1 | * | 12/1998 | F16B 2/20 |
| KR | 20050042341 A | * | 5/2005 | |

* cited by examiner

CLIP ASSEMBLY FOR VEHICLE TORSION RODS

BACKGROUND

Technical Field

The present disclosure generally relates to a clip assembly for vehicle torsion rods. More specifically, the present disclosure relates to a clip assembly including a clip and an elastic member configured to substantially prevent contact between torsion rods received by the clip assembly.

Background Information

Typical closure panels, such as a trunk, for a vehicle use two torsion rods to facilitate opening and closing the closure panel. The two torsion rods often contact each other, thereby generating unwanted noise and wear on the torque rods. The wear deteriorates the opening and closing performance of the torsion rods.

SUMMARY

A need exists for a clip assembly for vehicle torsion rods that substantially prevents contact between the torsion rods.

In view of the state of the known technology, one aspect of the present disclosure is to provide a clip assembly for torsion rods of a closure panel of a vehicle. The clip assembly includes a clip and an elastic member. The clip is configured to receive a first torsion rod and a second torsion rod. The elastic member is configured to be received by the clip. The clip includes a body member, a first leg extending outwardly in a first direction, and a second leg extending outwardly in a second direction opposite to the first direction. A first groove is disposed in the first leg and a second groove is disposed in the second leg. The first groove and the second groove are configured to receive the elastic member.

Another aspect of the present disclosure is to provide a torsion rod assembly for a closure panel of a vehicle. The torsion rod assembly includes a first torsion rod, a second torsion rod, and a clip assembly. The first torsion rod is configured to be connected to the closure panel. The second torsion rod is configured to be connected to the closure panel. The clip assembly includes a clip and an elastic member. The clip receives the first torsion rod and the second torsion rod. The elastic member is received by the clip. The clip includes a body member, a first leg extending outwardly in a first direction, and a second leg extending outwardly in a second direction opposite to the first direction. The first groove is disposed in the first leg and a second groove is disposed in the second leg. The first groove and the second groove receive the elastic member.

Also other objects, features, aspects and advantages of the disclosed clip assembly for vehicle torsion rods will become apparent to those skilled in the art from the following detailed description, which, taken in conjunction with the annexed drawings, discloses exemplary embodiments of a clip assembly for vehicle torsion rods.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
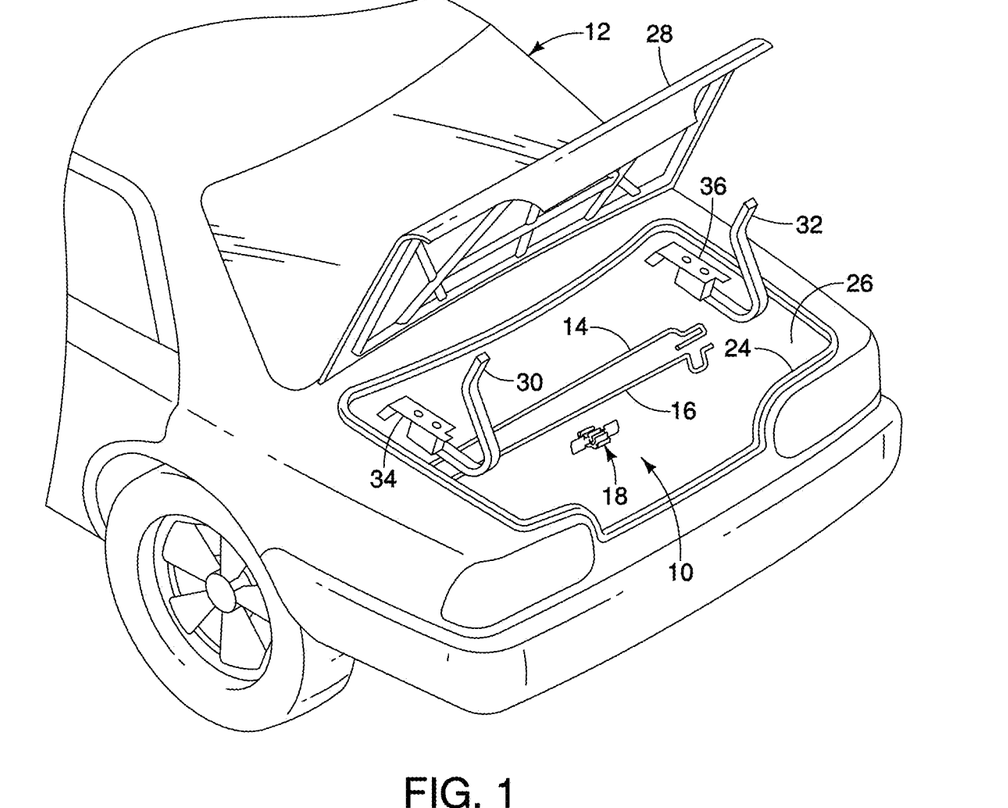
FIG. 1 is an exploded perspective view of torsion rods for a closure panel of a vehicle and a clip assembly in accordance with an exemplary embodiment.
Figure 2:
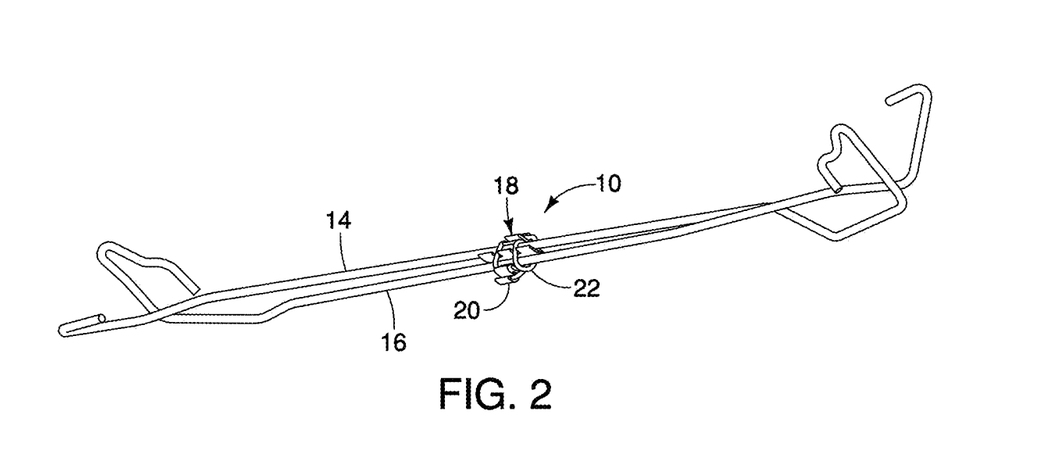
FIG. 2 is a perspective view of the clip assembly of FIG. 1.

Referring initially to FIG. 1, a torsion rod assembly 10 for a vehicle 12 is illustrated in accordance with an exemplary embodiment of the present invention. The torsion rod assembly 10 includes a first torsion rod 14, a second torsion rod 16, and a clip assembly 18. The clip assembly 18 includes a clip 20 and an elastic member 22, as shown in FIGS. 1-8.

As shown in FIG. 1, the vehicle 12 includes a rear opening 24 to provide access to a rear cargo space 26. The rear opening 24 exposes the rear cargo space 26 with a closure panel 28 in an open position, as shown in FIG. 1. Moving the closure panel 28 to a closed position prevents access to the rear cargo space 26. Because closure panels, such as a trunk lid, and rear cargo areas of vehicles are well known, further description thereof is omitted for the sake of brevity. The first and second torsion rods 14 and 16 can be used with any suitable closure panel 28, such as a trunk lid, of any suitable vehicle, such as a sedan. The clip assembly 18 is configured to receive the first torsion rod 14 and the second torsion rod 16 of the closure panel 28 of the vehicle 12.

A first hinge member 30 and a second hinge member 32 are rotatably connected at a first end to first and second bracket members 34 and 36, respectively, as shown in FIG. 1. Second ends of the first and second hinge members 30 and 32 are fixed to the closure panel 28 to facilitate moving the closure panel 12 between closed and open positions. The first and second hinge members 30 and 32 are laterally spaced from one another on opposite lateral sides of the rear cargo space 26. The first and second torsion rods 14 and 16 are connected at a first end in a conventional manner to the first hinge member 30 and at a second end in a conventional manner to the second hinge member 32. In other words, the first and second torsion rods 14 and 16 are connected to the closure panel 28 through the first and second bracket members 34 and 36 and the first and second hinge arms 30 and 32, respectively. The first and second hinge members 30 and 32 and the first and second bracket members 34 and 36 are conventional, and the operation thereof is conventional, and further description thereof is omitted for the sake of brevity.

Figure 3:
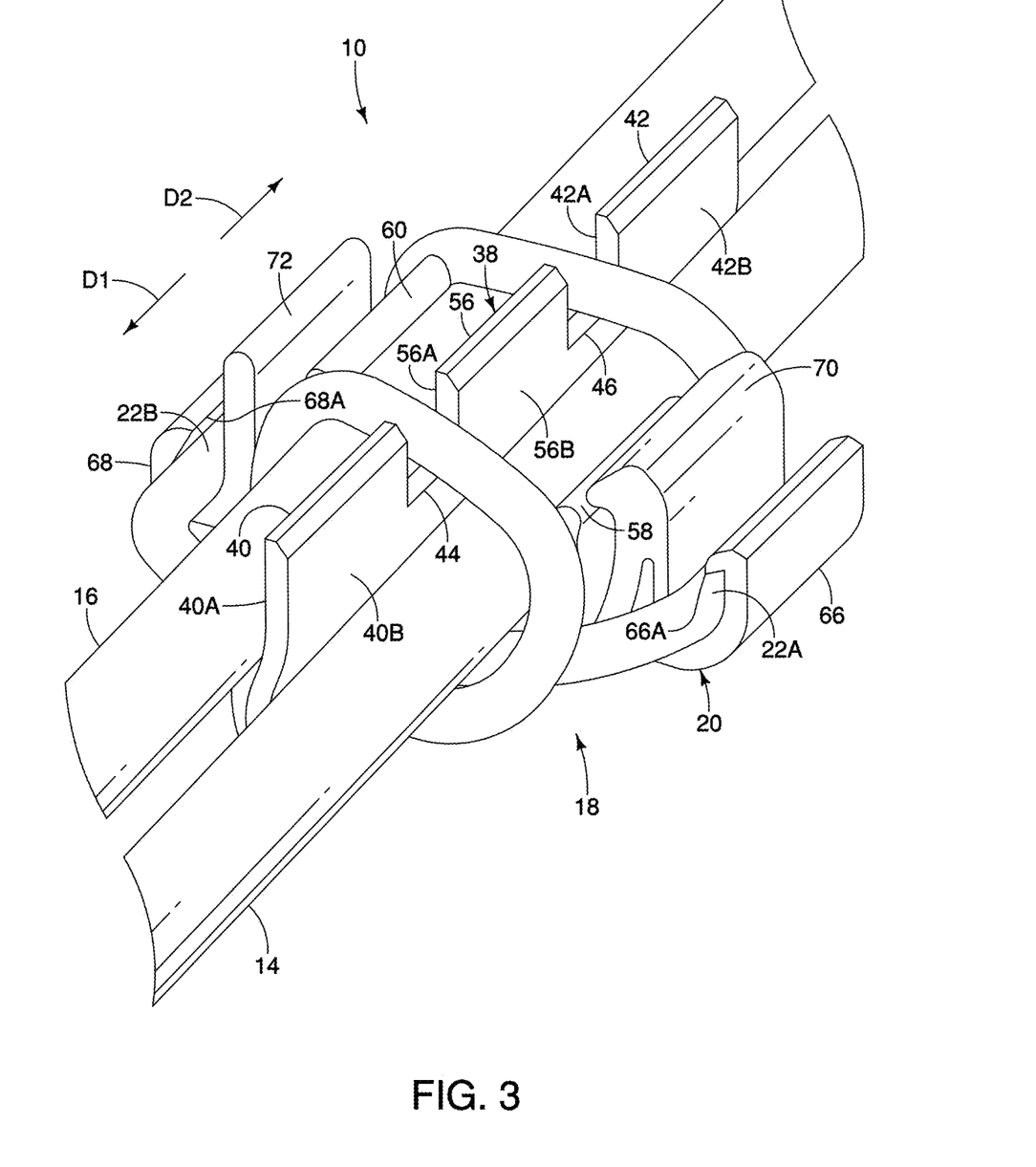
FIG. 3 is an upper perspective view of the clip assembly of FIG. 2 from a first side.
Figure 4:
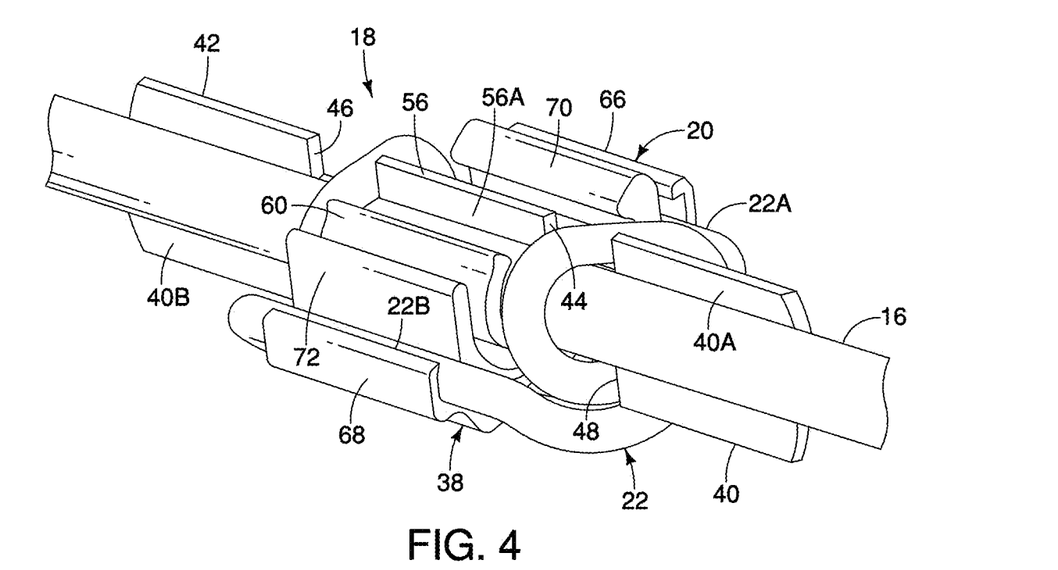
FIG. 4 is an upper perspective view of the clip assembly of FIG. 2 from a second side.

The clip 20 of the clip assembly 18 is configured to receive the first torsion rod 14 and the second torsion rod 16, as shown in FIGS. 1-6. The clip 20 includes a body member 38, a first leg 40 and a second leg 42. The first leg 40 extends outwardly in a first direction D1 from the body member 38. The second leg 42 extends outwardly in a second direction D2 from the body member 38. The second direction D2 is opposite to the first direction D1, as shown in FIGS. 3 and 4.

Figure 5:
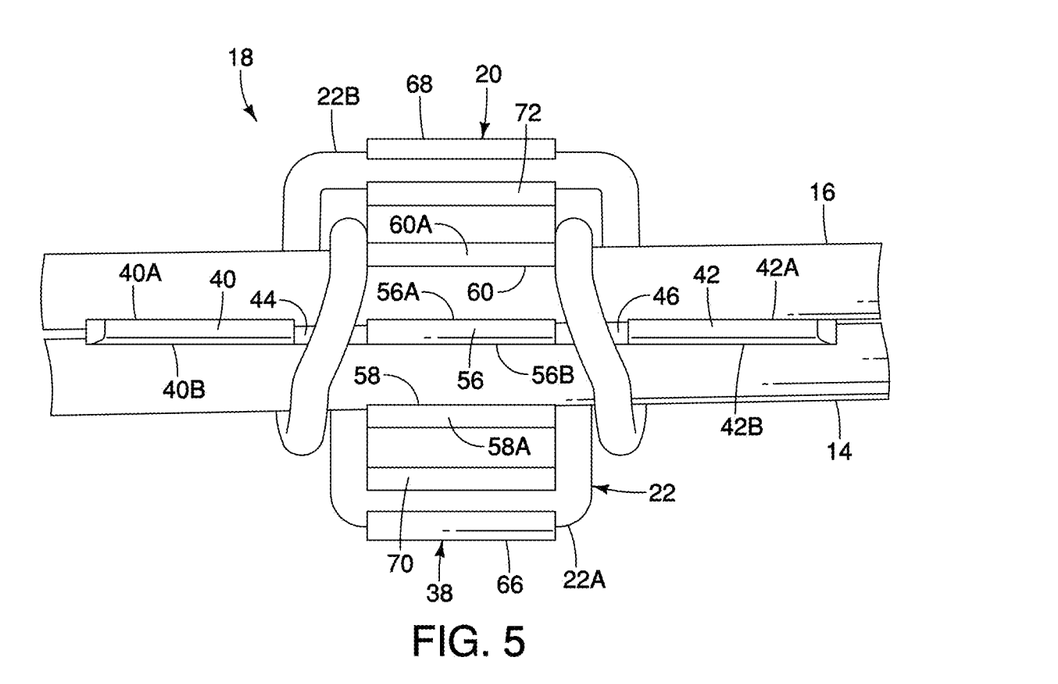
FIG. 5 is a front perspective view of the clip assembly of FIG. 2.
Figure 6:
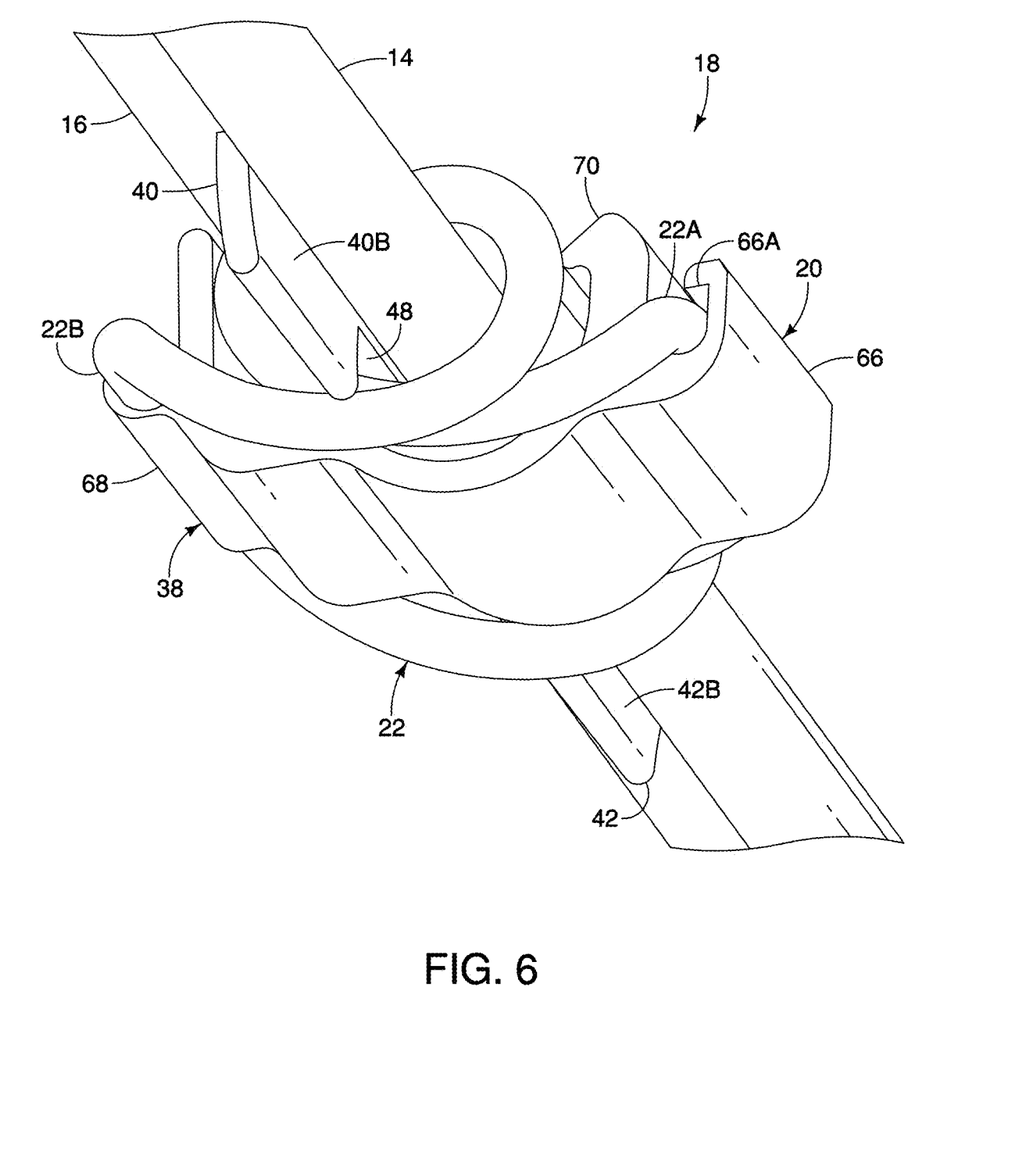
FIG. 6 is a lower perspective view of the clip assembly of FIG. 2.
Figure 7:
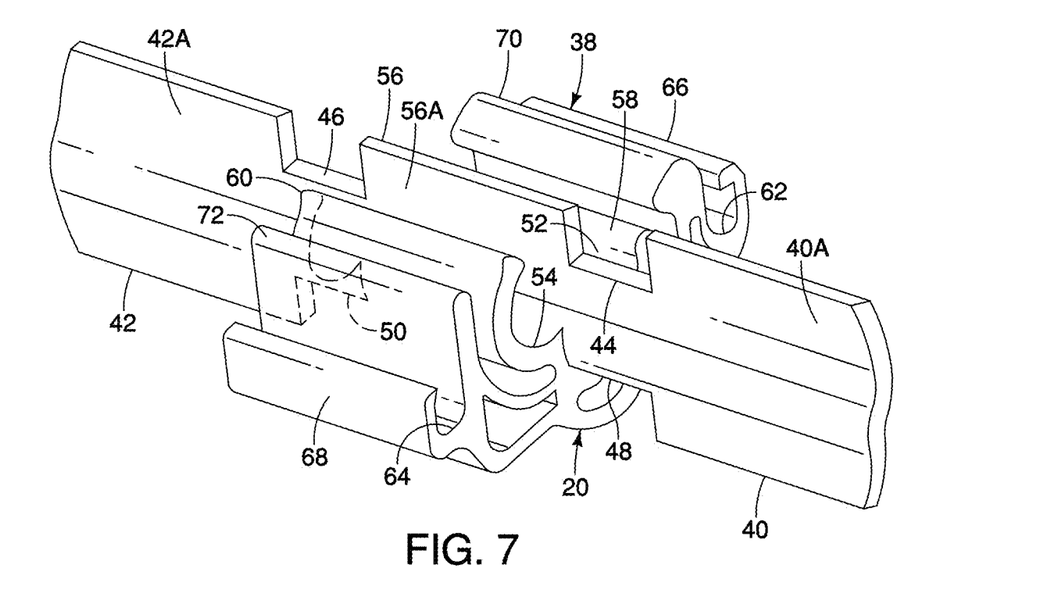
FIG. 7 is a perspective view of the clip of the clip assembly of FIG. 2.

A first groove 44 is disposed in the first leg 40, as shown in FIGS. 2-7. The first groove 44 is disposed in the first leg 40 adjacent the body member 38, as shown in FIG. 7, although the first groove 44 can be disposed in the first leg 40 in any suitable location. A second groove 46 is disposed in the second leg 42. The second groove 46 is disposed in the second leg 42 adjacent the body member 38, although the second groove 46 can be disposed in the second leg 42 in any suitable location. The first groove 44 and the second groove 46 are configured to receive the elastic member 22.

A third groove 48 is disposed in the first leg 40, as shown in FIGS. 2-7. The third groove 48 is disposed in the first leg 40 adjacent the body member 38, as shown in FIG. 7, although the third groove 48 can be disposed in the first leg 40 in any suitable location. A fourth groove 50 is disposed in the second leg 42. The fourth groove 50 is disposed in the second leg 42 adjacent the body member 38, although the fourth groove 50 can be disposed in the second leg 42 in any suitable location. The third groove 48 and the fourth groove 50 are configured to receive the elastic member 22. As shown in FIG. 7, the first groove 44 is disposed above the third groove 48 in the first leg 40. The second groove 46 is disposed above the fourth groove 50 in the second leg 42.

The first leg 40 has a first surface 40A and a second surface 40B. The second surface 40B of the first leg 40 faces in a direction substantially opposite to a direction that the first surface 40A faces. The second leg 42 has a first surface 42A and a second surface 42B. The second surface 42B of the second leg 42 faces in a direction substantially opposite to a direction that the first surface 42A faces.

Figure 8:
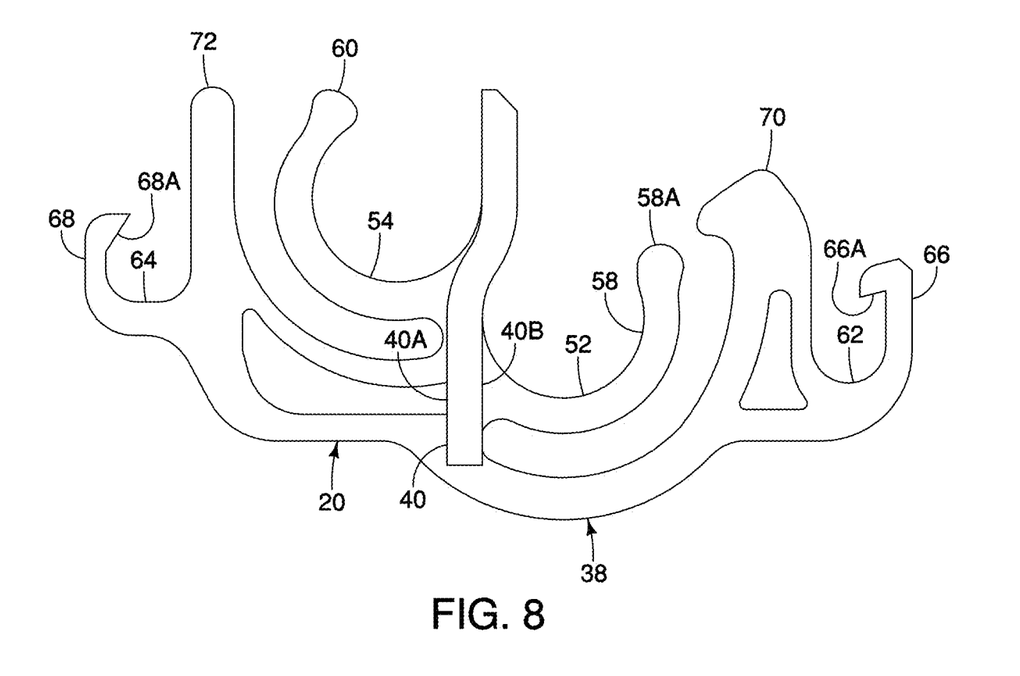
FIG. 8 is a side elevational view in cross section of the clip of FIG. 7.

The body member 38 includes a first retaining portion 52 configured to receive the first torsion rod 14 and a second retaining portion 54 configured to receive the second torsion rod 16, as shown in FIGS. 7 and 8. The body member 38 includes a base member 56 having a first surface 56A and a second surface 56B, as shown in FIGS. 3-5, 7 and 8. The first surface 56A preferably faces in a direction substantially opposite to the second surface 56B.

A first arm 58 extends outwardly from the second surface 56B of the base member 56, as shown in FIGS. 3, 5, 7 and 8. The first retaining portion 52 is defined by the second surface 56B of the base member 56 and the first arm 58. The first arm 58 is preferably curved to facilitate receiving the first torsion rod 14. A free end 58A of the first arm 58 is disposed higher than an uppermost surface of the first torsion rod 14 received by the first retaining portion 52.

A second arm 60 extends outwardly from the first surface 56A of the base member 56, as shown in FIGS. 3, 5, 7 and 8. The second retaining portion 54 is defined by the first surface 56A of the base member 56 and the second arm 60. The second arm 60 is preferably curved to facilitate receiving the second torsion rod 16. A free end 60A of the second arm is disposed higher than an uppermost surface of the second torsion rod 16 received by the second retaining portion 54.

The first leg 40 is disposed between the first retaining portion 52 and the second retaining portion 54 when viewed in a lateral direction of the clip 20, as shown in FIGS. 7 and 8. The second leg 42 is disposed between the first retaining portion 52 and the second retaining portion 54 when viewed in a lateral direction of the clip 20. The lateral direction of the clip 20 is a direction parallel to an axial direction of the first and second torsion rods 14 and 16.

The body member 38 includes a first receiving portion 62 configured to receive a first portion 22A of the elastic member 22, as shown in FIGS. 3-6. The body member 38 includes a second receiving portion 64 configured to receive a second portion 22B of the elastic member 22.

A third arm 66 extends outwardly from a first strengthening member 70, as shown in FIGS. 3-8. The first receiving portion 62 is defined by the first strengthening member 70 and the third arm 66. The third arm 66 is preferably curved to facilitate receiving the first portion 22A of the elastic member 22. A first hook 66A is disposed at a free end of the third arm 66 to facilitate retaining the first portion 22A of the elastic member 22. In other words, the first receiving portion 62 includes the first hook 66A to facilitate securely receiving the first portion 22A of the elastic member 22.

A fourth arm 68 extends outwardly from a second strengthening member 72, as shown in FIGS. 3-8. The second receiving portion 64 is defined by the second strengthening member 72 and the fourth arm 68. The fourth arm 68 is preferably curved to facilitate receiving the second portion 22B of the elastic member 22. A second hook 68A is disposed at a free end of the fourth arm 68 to facilitate retaining the second portion 22B of the elastic member 22. In other words, the second receiving portion 64 includes the second hook 68A to facilitate securely receiving the second portion 22B of the elastic member 22.

The first leg 40 is disposed between the first receiving portion 62 and the second receiving portion 64 when viewed in the lateral direction of the clip 20, as shown in FIGS. 7 and 8. The second leg 42 is disposed between the first receiving portion 62 and the second receiving portion 64 when viewed in the lateral direction of the clip 20.

The first strengthening member 70 extends outwardly from the second surface 56B of the base member 56 of the body member 28 of the clip 20, as shown in FIGS. 3-8. The first strengthening member 70 is disposed between the first arm 58 and the third arm 66 when viewed in the lateral direction of the clip 20, as shown in FIG. 8.

The second strengthening member 72 extends outwardly from the first surface 56A of the base member 56 of the body member 28 of the clip 20, as shown in FIGS. 3-8. The second strengthening member 72 is disposed between the second arm 60 and the fourth arm 68 when viewed in the lateral direction of the clip 20, as shown in FIG. 8.

The clip 20 is preferably unitarily formed as a one-piece member, as shown in FIGS. 3-8. The clip is formed of any suitable material, such as a hard plastic.

The elastic member 22 of the clip assembly 18 is configured to be received by the clip 20, as shown in FIGS. 1-6. The elastic member 22 is preferably a continuous piece of material, such as a loop. The first portion 22A and the second portion 22B of the elastic member 22 are preferably unitarily formed as a one-piece member. The elastic member 22 is made of any suitable material, such as rubber.

The clip 20 receives the first torsion rod 14 and the second torsion rod 16, as shown in FIGS. 2-6. The first retaining portion 52 receives the first torsion rod 14, and the second retaining portion 54 receives the second torsion rod 16. The clip 20 can be disposed at any suitable position along a length of the first and second torsion rods 14 and 16. The elastic member 22 is then connected to the clip 20 to securely retain the first and second torsion rods 14 and 16 in the first and second retaining portions 52 and 54, respectively. The first torsion rod 14 contacts the second surfaces 40B, 42B and 56B of the first leg 40, the second leg 42 and the body member 56, respectively. The second torsion rod 16 contacts the first surfaces 40A, 42A and 56A of the first leg 40, the second leg 42 and the body member 56, respectively. In other words, the first and second torsion rods 14 and 16 are received on opposite sides of the first leg, 40, the second leg 42 and the body member 56.

The first portion 22A of the elastic member 22 is disposed in the first receiving portion 62. The elastic member 22 passes beneath the first torsion rod 14 and through the third and fourth grooves 48 and 50 in the first and second legs 40 and 42. The elastic member 22 then passes beneath the second torsion rod 16, and then passes around and over the second torsion rod 16 and through the first and second grooves 44 and 46 in the first and second legs 40 and 42. The elastic member 22 then passes around and beneath the first torsion rod 14, and then passes through the third and fourth grooves 48 and 50 a second time. The second pass of the elastic member 22 through the third and fourth grooves 48 and 50 is disposed outwardly of the first pass of the elastic member through the third and fourth grooves 48 and 50. The elastic member 22 then passes beneath the second torsion rod 16 and is received by the second receiving portion 64. As shown in FIGS. 3-5, the elastic member 22 passes through each of the first and second grooves 44 and 46 one time. As shown in FIGS. 3, 4 and 6, the elastic member 22 passes through each of the third and fourth grooves 48 and 50 two times. The elastic member 22 contacts the uppermost surfaces of the first and second torsion rods 14 and 16, as shown in FIGS. 3-6. The elastic member 22 contacting the first and second torsion rods 14 and 16 substantially prevents lateral movement of the clip assembly 20 along the first and second torsion rods 14 and 16. The first and second hooks 66A and 68A facilitate securely retaining the elastic member 22 to the clip 20.

As shown in FIGS. 3-5, in the assembled state in which the clip assembly 18 receives the first and second torsion rods 14 and 16, each of the first and second legs 40 and 42 extends above uppermost surfaces of the first and second torsion rods 14 and 16. As shown in FIGS. 4 and 6, in the assembled state, each of the first and second legs 40 and 42 extends below lowermost surfaces of the first and second torsion rods 14 and 16. The first and second torsion rods 14 and 16 are disposed between the first receiving portion 62 and the second receiving portion 64, as shown in FIGS. 3-8.

The clip assembly 20 substantially prevents contact between the first and second torsion rods 14 and 16. The clip assembly 20 further substantially prevents lateral movement of the clip assembly relative to the first and second torsion rods 14 and 26. The clip assembly 20 substantially eliminates noise generated by contact between the first and second torsion rods 14 and 16.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle charge port assembly. Accordingly, these terms, as utilized to describe the present invention should be interpreted relative to a vehicle equipped with the vehicle charge port assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A clip assembly for torsion rods of a closure panel of a vehicle comprising:
   a clip configured to receive a first torsion rod and a second torsion rod; and
   an elastic member configured to be received by the clip,
   the clip including a body member, a first leg extending outwardly in a first direction, and a second leg extending outwardly in a second direction opposite to the first direction,
   a first groove being disposed in the first leg and a second groove being disposed in the second leg, the first groove and the second groove being configured to receive the elastic member.

2. The clip assembly according to claim 1, wherein
   the body member includes a first retaining portion configured to receive the first torsion rod and a second retaining portion configured to receive the second torsion rod.

3. The clip assembly according to claim 2, wherein
   the first leg and the second leg are disposed between the first retaining portion and the second retaining portion when viewed in a lateral direction of the clip.

4. The clip assembly according to claim 1, wherein
   a third groove is disposed in the first leg and a fourth groove is disposed in the second leg, the third groove and the fourth groove being configured to receive the elastic member.

5. The clip assembly according to claim 4, wherein
   the first groove is disposed above the third groove, and the second groove is disposed above the fourth groove.

6. The clip assembly according to claim 1, wherein
a first receiving portion is configured to receive a first end of the elastic member, and a second receiving portion is configured to receive a second end of the elastic member.

7. The clip assembly according to claim 6, wherein
the first leg and the second leg are disposed between the first receiving portion and the second receiving portion when viewed in a lateral direction of the clip.

8. The clip assembly according to claim 6, wherein
the first receiving portion includes a first hook and the second receiving portion includes a second hook to facilitate securely receiving the elastic member.

9. A torsion rod assembly for a closure panel of a vehicle comprising:
   a first torsion rod configured to be connected to the closure panel;
   a second torsion rod configured to be connected to the closure panel; and
   a clip assembly, the clip assembly including
      a clip receiving the first torsion rod and the second torsion rod, and
      an elastic member received by the clip,
   the clip including a body member, a first leg extending outwardly in a first direction, and a second leg extending outwardly in a second direction opposite to the first direction,
   a first groove being disposed in the first leg and a second groove being disposed in the second leg, the first groove and the second groove receiving the elastic member.

10. The torsion rod assembly according to claim 9, wherein
a third groove is disposed in the first leg and a fourth groove is disposed in the second leg, the third groove and the fourth groove being configured to receive the elastic member.

11. The torsion rod assembly according to claim 10, wherein
the elastic member passes through each of the first and second grooves one time.

12. The torsion rod assembly according to claim 11, wherein
the elastic member passes through each of the third and fourth grooves two times.

13. The torsion rod assembly according to claim 9, wherein
the body member includes a first retaining portion receiving the first torsion rod and a second retaining portion receiving the second torsion rod.

14. The torsion rod assembly according to claim 13, wherein
the first leg and the second leg are disposed between the first torsion rod and the second torsion rod when viewed in a lateral direction of the clip.

15. The torsion rod assembly according to claim 9, wherein
each of the first and second legs extends above the first and second torsion rods.

16. The torsion rod assembly according to claim 15, wherein
each of the first and second legs extends below the first and second torsion rods.

17. The torsion rod assembly according to claim 9, wherein
a first receiving portion receives a first end of the elastic member, and a second receiving portion receives a second end of the elastic member.

18. The torsion rod assembly according to claim 17, wherein
the first leg and the second leg are disposed between the first receiving portion and the second receiving portion when viewed in a lateral direction of the clip.

19. The torsion rod assembly according to claim 17, wherein
the first torsion rod and the second torsion rod are disposed between the first receiving portion and the second receiving portion when viewed in a lateral direction of the clip.

20. The torsion rod assembly according to claim 9, wherein
the elastic member contacts an uppermost surface of each of the first and second torsion rods.

* * * * *